US 11,822,849 B2

(12) United States Patent
Yamada et al.

(10) Patent No.: US 11,822,849 B2
(45) Date of Patent: *Nov. 21, 2023

(54) DISPLAY DEVICE FOR A VEHICLE

(71) Applicant: TOYOTA JIDOSHA KABUSHIKI KAISHA, Toyota (JP)

(72) Inventors: Yoshinori Yamada, Nagakute (JP); Masaki Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

This patent is subject to a terminal disclaimer.

(21) Appl. No.: 17/528,644

(22) Filed: Nov. 17, 2021

(65) Prior Publication Data

US 2022/0075588 A1 Mar. 10, 2022

Related U.S. Application Data

(63) Continuation of application No. 16/527,383, filed on Jul. 31, 2019, now Pat. No. 11,256,462.

(30) Foreign Application Priority Data

Aug. 2, 2018 (JP) .................................. 2018-145743

(51) Int. Cl.
*G06F 3/14* (2006.01)
*G05D 1/02* (2020.01)
(Continued)

(52) U.S. Cl.
CPC ............ *G06F 3/1423* (2013.01); *B60K 35/00* (2013.01); *B60W 50/10* (2013.01); *G05D 1/021* (2013.01);
(Continued)

(58) Field of Classification Search
CPC ..... G06F 3/1423; G06F 3/1446; B60K 35/00; B60K 2370/152; B60K 2370/175;
(Continued)

(56) References Cited

U.S. PATENT DOCUMENTS 7,489,303 B1 2/2009 Pryor
9,849,832 B2* 12/2017 Mori ........................ B60R 1/00
(Continued)

FOREIGN PATENT DOCUMENTS

JP 2006-103589 A 4/2006
JP 2015-168264 A 9/2015
(Continued)

OTHER PUBLICATIONS

U.S. Appl. No. 16/527,383, filed Jul. 31, 2019, Yoshinori Yamada et al.

*Primary Examiner* — Richard M Camby
(74) *Attorney, Agent, or Firm* — Dinsmore & Shohl LLP

(57) ABSTRACT

A display control device for a vehicle is provided. The display control device includes a processor configured to display a primary plan on a first display and a secondary plan on a second display. The primary plan is to be performed next after a vehicle action currently being performed, and the secondary plan is to be performed subsequently to the primary plan. The first display may be provided on an upper side of the second display. The first display may be a head-up display, and the second display may be a meter panel.

12 Claims, 4 Drawing Sheets

(51) Int. Cl.
*B60K 35/00* (2006.01)
*B60W 50/10* (2012.01)
*G09G 5/14* (2006.01)
*G09G 5/38* (2006.01)

(52) U.S. Cl.
CPC ............... *G09G 5/14* (2013.01); *G09G 5/38* (2013.01); *B60K 2370/152* (2019.05); *B60K 2370/175* (2019.05); *B60K 2370/52* (2019.05); *G05D 2201/0213* (2013.01); *G09G 2340/0471* (2013.01); *G09G 2380/10* (2013.01)

(58) Field of Classification Search
CPC ........ B60K 2370/52; B60K 2370/1523; B60K 2370/1529; B60K 2370/166; B60K 2370/182; B60K 2370/1868; B60W 50/10; B60W 60/001; B60W 2050/146; B60W 2540/215; G05D 1/021; G05D 2201/0213; G09G 5/14; G09G 5/38; G09G 2340/0471; G09G 2380/10

See application file for complete search history.

(56) References Cited

U.S. PATENT DOCUMENTS

| | | | |
|---|---|---|---|
| 10,099,692 B2* | 10/2018 | Matsunaga | G05D 1/0219 |
| 10,994,613 B2 | 5/2021 | Hirata | |
| 11,256,462 B2* | 2/2022 | Yamada | G09G 5/14 |
| 2010/0253593 A1 | 10/2010 | Seder et al. | |
| 2010/0253600 A1 | 10/2010 | Seder et al. | |
| 2012/0173067 A1 | 7/2012 | Szczerba et al. | |
| 2017/0021765 A1* | 1/2017 | Mori | B60R 1/00 |
| 2017/0267241 A1* | 9/2017 | Matsunaga | B60W 50/12 |
| 2018/0345991 A1 | 12/2018 | Mimura et al. | |
| 2018/0348756 A1 | 12/2018 | Mimura et al. | |
| 2018/0348758 A1 | 12/2018 | Nakamura et al. | |
| 2020/0180434 A1* | 6/2020 | Tachibana | G01C 21/26 |

FOREIGN PATENT DOCUMENTS

| | | |
|---|---|---|
| JP | 2017-091115 A | 5/2017 |
| WO | 2019/008703 A1 | 1/2019 |

* cited by examiner

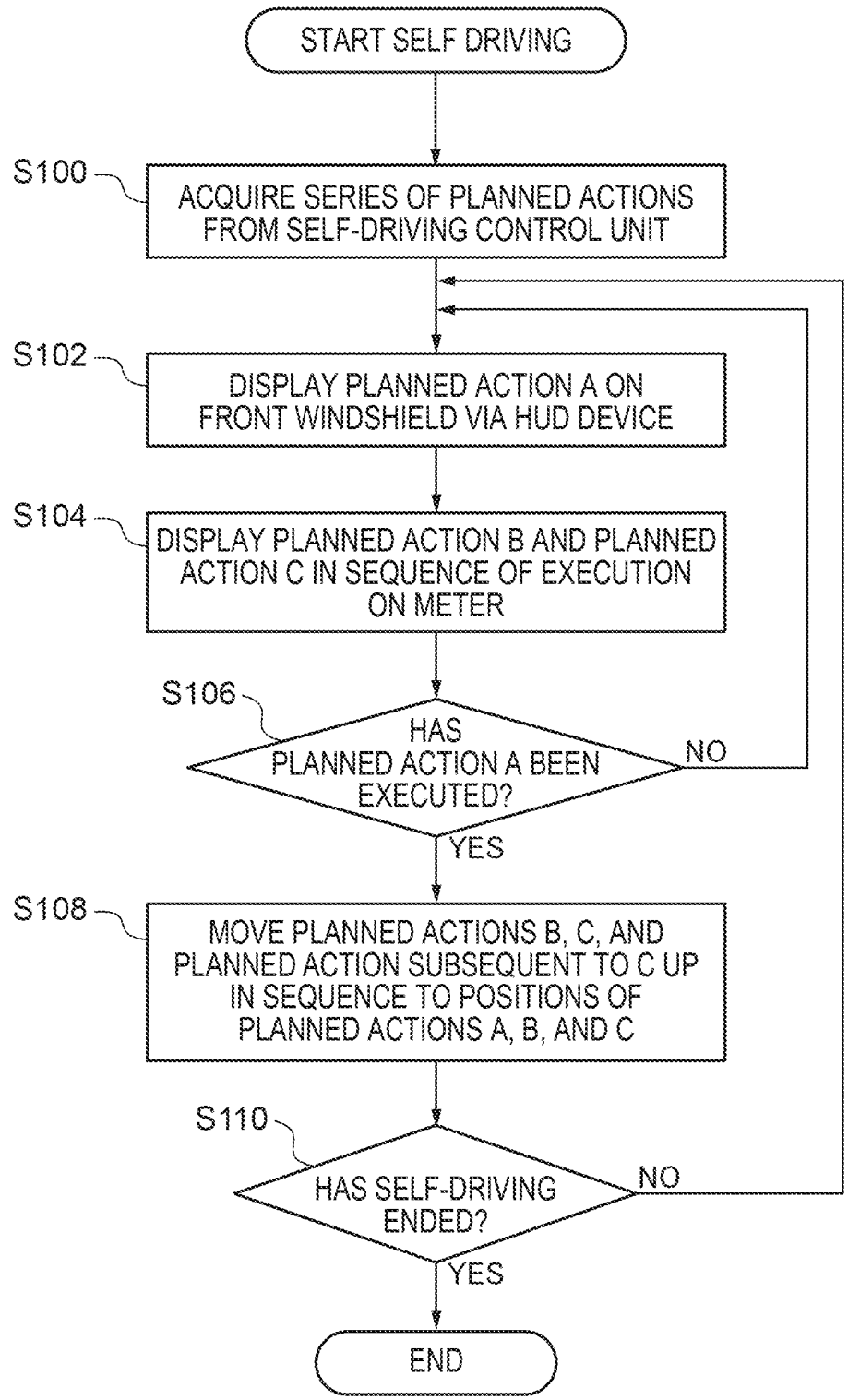

DISPLAY DEVICE FOR A VEHICLE

CROSS-REFERENCE TO RELATED APPLICATION

This application is a continuation of U.S. patent application Ser. No. 16/527,383 filed on Jul. 31, 2019 which claims priority under 35 USC 119 from Japanese Patent Application No. 2018-145743 filed on Aug. 2, 2018, the disclosure of which is incorporated by reference herein.

BACKGROUND

Technical Field

The present disclosure relates to a display device for a vehicle.

Related Art

An invention relating to a display device for a vehicle is disclosed in Japanese Unexamined Patent Application (JP-A) No. 2017-091115. In this display device for a vehicle, when a vehicle that is performing self-driving overtakes an obstacle or the like, prior to the overtaking, a mark showing the direction of overtaking is displayed by a head-up display device (hereinafter, referred to as a 'HUD device') that projects a display onto a front windshield glass (hereinafter, referred to as a 'front windshield'). As a result, because a vehicle occupant is able to ascertain in advance the planned action of the self-driving vehicle, any anxiety felt by the vehicle occupant if the self-driving vehicle were to unexpectedly perform a different action from that currently being performed can be reduced.

However, in the case of the technology described in JP-A No. 2017-091115, although it is possible for the next planned action of the self-driving vehicle to be ascertained, any subsequent planned action after that cannot be ascertained, and because a vehicle occupant is unable to intuitively understand whether the vehicle is traveling in a direction or to a destination desired by the vehicle occupant, it is possible that the vehicle occupant will become anxious as a consequence. Accordingly, the above-described technology has room for improvement in this regard.

SUMMARY

The present disclosure provides a display device for a vehicle that enables a sense of anxiety experienced by a vehicle occupant of a vehicle that is capable of performing self-driving to be reduced when that vehicle is performing self-driving.

A first aspect of the present disclosure is a display device for a vehicle having a projection device that is provided on a vehicle cabin interior side of a front windshield glass, in a vehicle that is capable of performing self-driving, and that displays information by projecting projection light that is used to display information onto the front windshield glass so that the information appears superimposed on scenery visible in front of the vehicle, a display device that is provided in an instrument panel of the vehicle, and that displays information towards a vehicle occupant seat side, and a display control unit that, among planned actions acquired from a self-driving control unit that controls self-driving of the vehicle that is capable of performing self-driving, causes a planned action, that is to be performed next after a vehicle action currently being performed, to be displayed as a primary planned action by the projection device, and also causes planned actions, that are to be performed subsequently to the primary planned action, to be displayed as secondary planned actions in a sequence in which these actions are to be performed starting from a position on the display device that is closest to the projection device.

According to the above-described first aspect, a display device for a vehicle has a projection device, a display device, and a display control unit. The projection device is provided on a vehicle cabin interior side of a front windshield, and displays information by projecting projection light that is used to display information onto the front windshield so that this information appears superimposed on scenery visible in front of the vehicle. The display device is provided in an instrument panel of the vehicle, and displays information towards a vehicle occupant seat. The display control unit acquires planned actions of a vehicle from a self-driving control unit that controls self-driving of the vehicle when that vehicle is performing self-driving. Furthermore, of the acquired planned actions, the display control unit causes the planned action that is to be to be performed next after the vehicle action currently being performed to be displayed as a primary planned action by the projection device. Additionally, of the acquired planned actions, the display control device causes planned actions that are to be performed subsequently to the primary planned action to be displayed as secondary planned actions on the display device. In other words, several planned actions that are to be performed subsequently to the current vehicle action are continuously displayed by the projection device and the display device. In addition, the primary planned action, which is the very next planned action to be performed, and the secondary planned actions, which are the planned actions to be performed subsequently to the primary planned action are displayed in mutually different positions. Accordingly, a vehicle occupant is able to immediately ascertain a plurality of planned actions, and the vehicle occupant can intuitively understand both the planned action to be performed next, and the planned actions to be performed subsequently to that. Moreover, because the secondary planned actions are displayed in the sequence in which they are to be performed starting from a location on the display device that is close to the projection device, the planned actions are displayed connected to each other in the sequence in which they are to be executed starting from the projection device and approaching the display device. As a result, a vehicle occupant is able to understand intuitively the flow of a series of planned actions.

Here, a planned action refers not only to various types of actions performed by a vehicle such as traveling and stopping, but also includes various types of actions that occur or are necessary when a user travels by vehicle to a destination such as taking a rest break, passing through a toll gate, traveling to a stopover destination, and the like.

A second aspect of the present disclosure is the display device for a vehicle of the first aspect, wherein the secondary planned actions are displayed on a meter panel.

According to the above-described second aspect, the secondary planned actions are displayed on a meter panel. Generally, because a meter panel is disposed in the instrument panel in a location that is close to the front windshield, the primary planned action displayed by the projection device and the secondary planned actions that are displayed on the meter panel can be displayed in comparatively close positions to each other. Accordingly, a vehicle occupant is able to intuitively understand the flow from the primary planned action to the secondary planned actions.

A third aspect of the present disclosure is the display device for a vehicle of the first or second aspects, wherein, once execution of the primary planned action displayed by the projection device has been completed, a planned action that is to be performed soonest among the secondary planned actions displayed on the display device is moved up to a position of the primary planned action and is displayed by the projection device.

According to the above-described third aspect, once the execution of the primary planned action displayed by the projection device has been completed, then out of the secondary planned actions displayed on the display device, the planned action that is to be performed soonest is moved up to the position of the primary planned action and is displayed by the projection device. Accordingly, a vehicle occupant is able to more intuitively understand the flow of a series of planned actions.

A fourth aspect of the present disclosure is the display device for a vehicle of any one of the first through third aspects, wherein the primary planned action and the secondary planned actions are displayed so as to be arranged in a substantially rectilinear row when viewed from the side of the vehicle occupant seat.

According to the above-described fourth aspect, because the primary planned action and the secondary planned actions are displayed by being arranged in a substantially rectilinear row when viewed from the side of the vehicle occupant seat, a vehicle occupant is able to even more intuitively understand the flow of a series of continuous primary and secondary planned actions.

A fifth aspect of the present disclosure is the display device for a vehicle of any one of the first through fourth aspects, wherein the secondary planned actions are displayed so as to be arranged in a row extending towards an outer side in a vehicle width direction and towards a vehicle lower side relative to the primary planned action when viewed from the side of the vehicle occupant seat.

According to the above-described fifth aspect, because the secondary planned actions are displayed by being arranged in a row extending towards an outer side in a vehicle width direction and towards a vehicle lower side relative to the primary planned action when viewed from the side of the vehicle occupant seat, the secondary planned actions are displayed in the manner of a perspective drawing whose center of perspectivity is the primary planned action that is displayed by being superimposed on the scenery to the front of the vehicle. Accordingly, a vehicle occupant is able to even more intuitively understand the flow of a sequence from the primary planned action to the secondary planned actions.

A sixth aspect of the present disclosure is the display device for a vehicle of any one of the first through fifth aspects, wherein, when a vehicle occupant performs an operation so as to insert an arbitrary planned action while the vehicle is performing self-driving, the arbitrary planned action can be displayed so as to be inserted as either the primary planned action or as any one of the secondary planned actions.

According to the above-described sixth aspect, when a vehicle occupant performs an operation so as to insert an arbitrary planned action while the vehicle is performing self-driving, because the arbitrary planned action can be displayed by being inserted as either the primary planned action or as any one of the secondary planned actions, the vehicle occupant is able to intuitively understand whether or not the vehicle has recognized the operation performed by the vehicle occupant.

As has been described above, the display device for a vehicle according to a first exemplary embodiment enables a sense of anxiety experienced by a vehicle occupant of a vehicle that is capable of performing self-driving to be reduced when that vehicle is traveling in self-driving mode.

Moreover, the display device for a vehicle according to the second though sixth aspects enables a sense of anxiety experienced by a vehicle occupant of a vehicle that is capable of performing self-driving to be reduced even further when that vehicle is traveling in self-driving mode.

BRIEF DESCRIPTION OF THE DRAWINGS

Exemplary embodiments of the present disclosure will be described in detail based on the following figures, wherein:

FIG. 4 is a flowchart used to illustrate an example of display processing executed by a display control unit of the display device for a vehicle according to the exemplary embodiment.

DETAILED DESCRIPTION

Hereinafter, an exemplary embodiment of a display device for a vehicle according to the present disclosure will be described using FIG. 1 through FIG. 4.

(Overall Structure)

Figure 1:
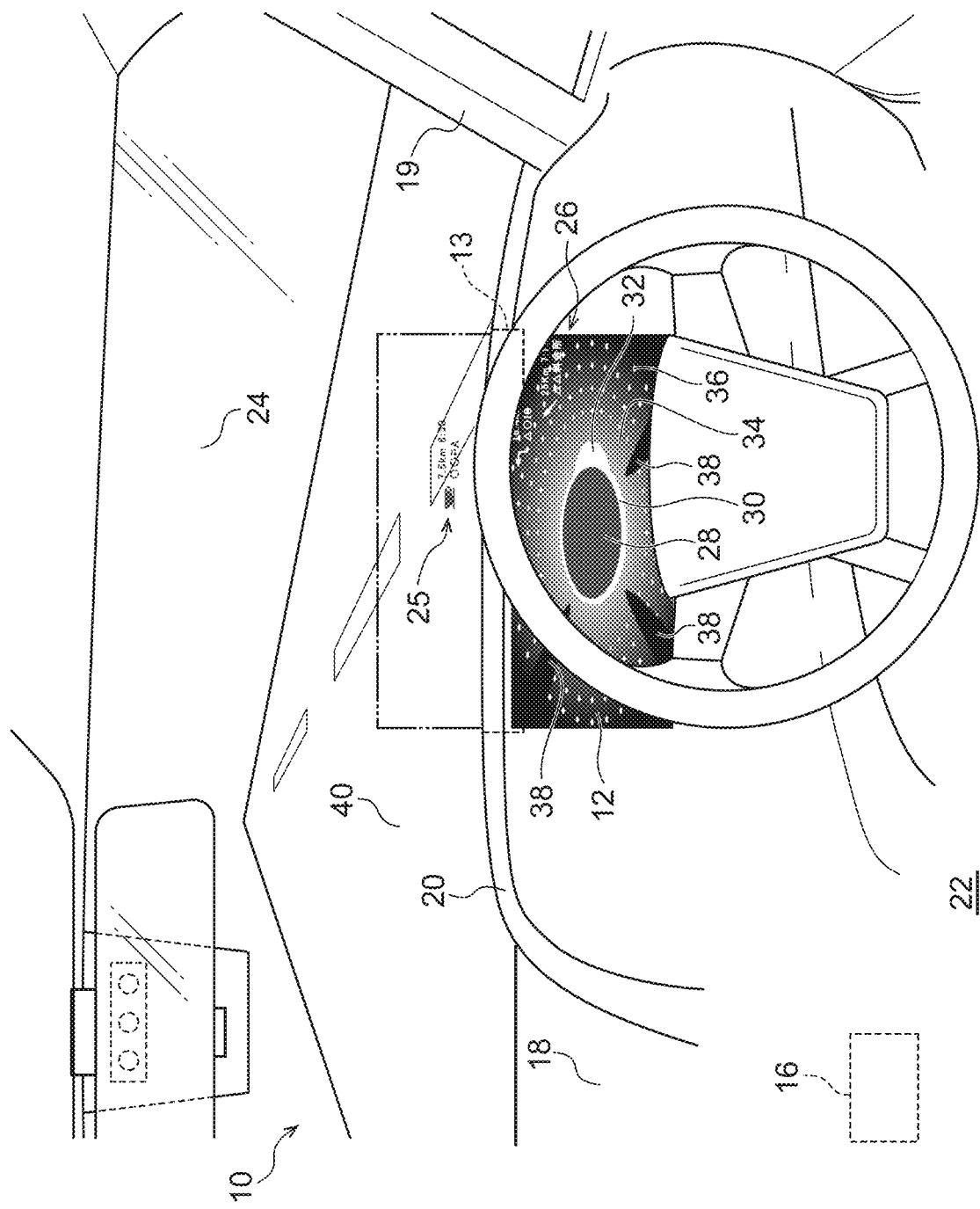
FIG. 1 is a schematic view showing an operating state of a display device for a vehicle according to an exemplary embodiment as seen from a viewpoint of a driver.

As is shown in FIG. 1, a display device for a vehicle 10 according to the present exemplary embodiment is provided in a vehicle that is capable of performing self-driving, and includes a meter panel 12 serving as a display device, a HUD device 13 serving as a projection device, and a display control device 16 serving as a display control unit. The meter panel 12 is provided within a meter cluster 20 (described below) in an instrument panel 18. This instrument panel 18 is provided on a vehicle front side inside a vehicle cabin 22. More specifically, the instrument panel 18 is disposed in an upper side of a vehicle rear side of a dash panel (not shown in the drawings) that separates the vehicle cabin 22 from a vehicle front portion. A lower end portion of the dash panel is joined to a front end portion of a floor panel (not shown in the drawings), and the floor panel forms part of a lower surface of the vehicle cabin 22. In addition, a cowling (not shown in the drawings) is joined to an upper end portion of the dash panel, and this cowling supports a lower end portion of a front windshield 24. The front windshield 24 forms part of a front surface on an upper side of the vehicle cabin 22, and a lower end portion thereof is disposed on an upper end side of the instrument panel 18.

Front seats (not shown in the drawings) are provided as vehicle occupant seats on a vehicle rear side of the instrument panel 18. In the present exemplary embodiment, the front seat on the front left side of the vehicle cabin 22 forms a front passenger's seat, while the front seat on the front right side of the vehicle cabin 22 forms a driver's seat.

The instrument panel 18 is formed as an interior finishing material extending in the vehicle width direction. An instrument panel reinforcement (not shown in the drawings) that is elongated in the vehicle width direction is disposed inside (i.e., on the vehicle front side) an upper portion of the instrument panel 18, and the instrument panel 18 is attached in a plurality of locations to this instrument panel reinforcement. Note that the instrument panel reinforcement is a metal pipe material, and both end portions in a longitudinal direction thereof are fixed respectively to a vehicle lower side of a pair of front pillars 19 (only one front pillar 19 is shown in FIG. 1) that extend upright at left and right vehicle body side portions.

(Display Panel)

The aforementioned meter cluster 20 is provided on the driver's seat side of the instrument panel 18. The meter cluster 20 is provided in an upper portion of the instrument panel 18 so as to protrude towards the vehicle upper side, and the meter panel 12 whose display surface faces towards the front seat (i.e., towards the driver's seat) side of the vehicle cabin 22 is provided inside the meter cluster 20. The meter panel 12 is formed, as an example, by a liquid crystal panel, and, as an example, a host vehicle display 28, an attention direction display 30, a peripheral situation display 34, an attention-requiring object display 38, and secondary planned actions 26 are displayed on the meter panel 12 by the display control device 16 that is connected thereto by wiring (not shown in the drawings). Each of these displays is described below in detail.

(HUD Device)

The HUD device 13 serving as a projection device is provided inside the instrument panel 18 on the driver's seat side. More specifically, the HUD device 13 is provided inside an aperture portion (not shown in the drawings) that is formed in an upper surface on the driver's seat side of the instrument panel 18 and opens towards the vehicle upper side. A display instrument (not shown in the drawings) that emits a light-emission image serving as emission light for displaying information and is connected via wiring (not shown in the drawings) to the display control device 16, and a reflective mirror (not shown in the drawings) that reflects the light-emission image emitted from the display instrument are provided inside the HUD device 13. The display instrument is disposed in a rear portion side in a vehicle front-rear direction inside the HUD device 13, and emits the light-emission image towards the vehicle front side. The display instrument is provided with a light source formed by light-emitting diodes or the like.

The reflective mirror is disposed on a front portion side in the vehicle front-rear direction inside the HUD device 13 so as to face towards the display instrument, and, as an example, is formed as a concave mirror that is disposed so as to present the concave surface thereof towards the display instrument. When looked at in a vehicle side view, the reflective mirror is disposed on an inclination such that an upper portion thereof is disposed on the vehicle front side and a lower portion thereof is disposed on the vehicle rear side. As a result, the light-emission image from the display instrument is reflected by the reflective mirror diagonally upwards and towards the vehicle rear side, and this light-emission image is also enlarged.

In the above-described structure, the light-emission image reflected by the reflective mirror is projected through the aperture portion formed in the upper surface of the instrument panel 18 and onto the front windshield 24. As a result, the light-emission image emitted from the display instrument is guided onto the reflective mirror where it is reflected, and the resulting enlarged light-emission image is projected onto a display range of the front windshield 24 which is demarcated by a double-dot chain line in FIG. 1.

Note that, as an example, the aperture portion formed in the upper surface of the instrument panel 18, and the display instrument and reflective mirror of the HUD device 13 have substantially the same dimensions in the vehicle width direction as the meter panel 12. As a consequence, the dimension in the vehicle width direction of the display range where a light-emission image is displayed by being projected onto the front windshield 24 is substantially the same as that of the meter panel 12 (see the double-dot chain line in FIG. 1).

The display control device 16 causes the HUD device 13 to display, as examples, a vehicle speed, and a primary planned action 25 on the front windshield 24. The displaying of the primary planned action 25 is described in detail below.

(Control Device)

The display control device 16 is formed so as to include a control ECU (Electronic Control Unit) and a navigation system (neither is shown in the drawings). The control ECU and the navigation system are each connected to a vehicle on-board network (not shown in the drawings) such as CAN (Controller Area Network) or the like. Additionally, the display control device 16 is also connected via the on-board vehicle network to a self-driving control unit (not shown in the drawings).

The navigation system displays a route to a destination that has been set by the driver of the vehicle. Based on position information for the vehicle measured by a GPS receiver unit (not shown in the drawings) and on map information from a map database, the navigation system calculates a route to be traveled by the vehicle. The route may also be set by selecting a preferred vehicle route from a space showing plurality of vehicle routes. The navigation system, for example, computes a target route from the vehicle's position to the destination, and then announces the target route to a vehicle occupant by displaying it on the meter panel 12 and via audio output from a speaker (not shown in the drawings). The navigation system is also able to transmit information about the target route of the vehicle to the control ECU that is connected to the on-board network. Note that the functions of the navigation system may also be stored on a computer in a facility such as an information processing center that is capable of communicating with a vehicle.

The self-driving control unit is connected, as an example, to a peripheral situation acquisition unit, a vehicle traveling state acquisition unit, and a map information storage and input unit (none of these are shown in the drawings). The self-driving control unit determines the situation of its own host vehicle as well as the peripheral situation around the host vehicle based on route information stored in the map information storage unit which stores information obtained from the navigation system, and on information obtained from various sensors, and performs self-driving control so as to control the amount of acceleration, the amount of braking, and the steering angle and the like required to reach the destination. In other words, the self-driving control unit causes its own host vehicle to perform self-driving by controlling its host vehicle based on the peripheral situation around the host vehicle detected by the peripheral situation acquisition unit. Note that because the self-driving control performed by the self-driving control unit is publicly disclosed in JP-A No. 2008-123197, a detailed description thereof is not given here.

When a command to execute self-driving has been issued by a vehicle occupant or the like and a destination has been set in the navigation system, the self-driving control unit calculates a series of planned actions from the current location to the destination. The self-driving control is then performed in accordance with the calculated planned actions, as well as with the aforementioned route information and information from the various sensors.

The control ECU of the display control device 16 is formed by a microcomputer that includes a CPU (Central Processing Unit), ROM (Read Only Memory), and RAM (Random Access Memory). Additionally, the meter panel 12 and the HUD device 13 are connected via circuitry (not shown in the drawings) to the control ECU.

The display control device 16 acquires the planned actions from the self-driving control unit, and, of these acquired planned actions, differentiates between the planned action (hereinafter, referred to as 'planned action A') that is to be performed next after the current vehicle action, and the planned actions that are to be performed subsequently to the planned action A that is to be performed next after the current vehicle action. In other words, out of a series of multiple planned actions, the display control device 16 differentiates between the planned action A and planned actions other than the planned action A. The display control device 16 then causes the planned action A to be displayed on the HUD device 13 as the primary planned action 25. In addition, the planned actions that are to be performed subsequently to the planned action that is to be performed next after the current vehicle action, in other words, the planned actions that are to be performed subsequently to the planned action A are displayed on the meter panel 12 as secondary planned actions.

(Primary Planned Action)

Figure 2:
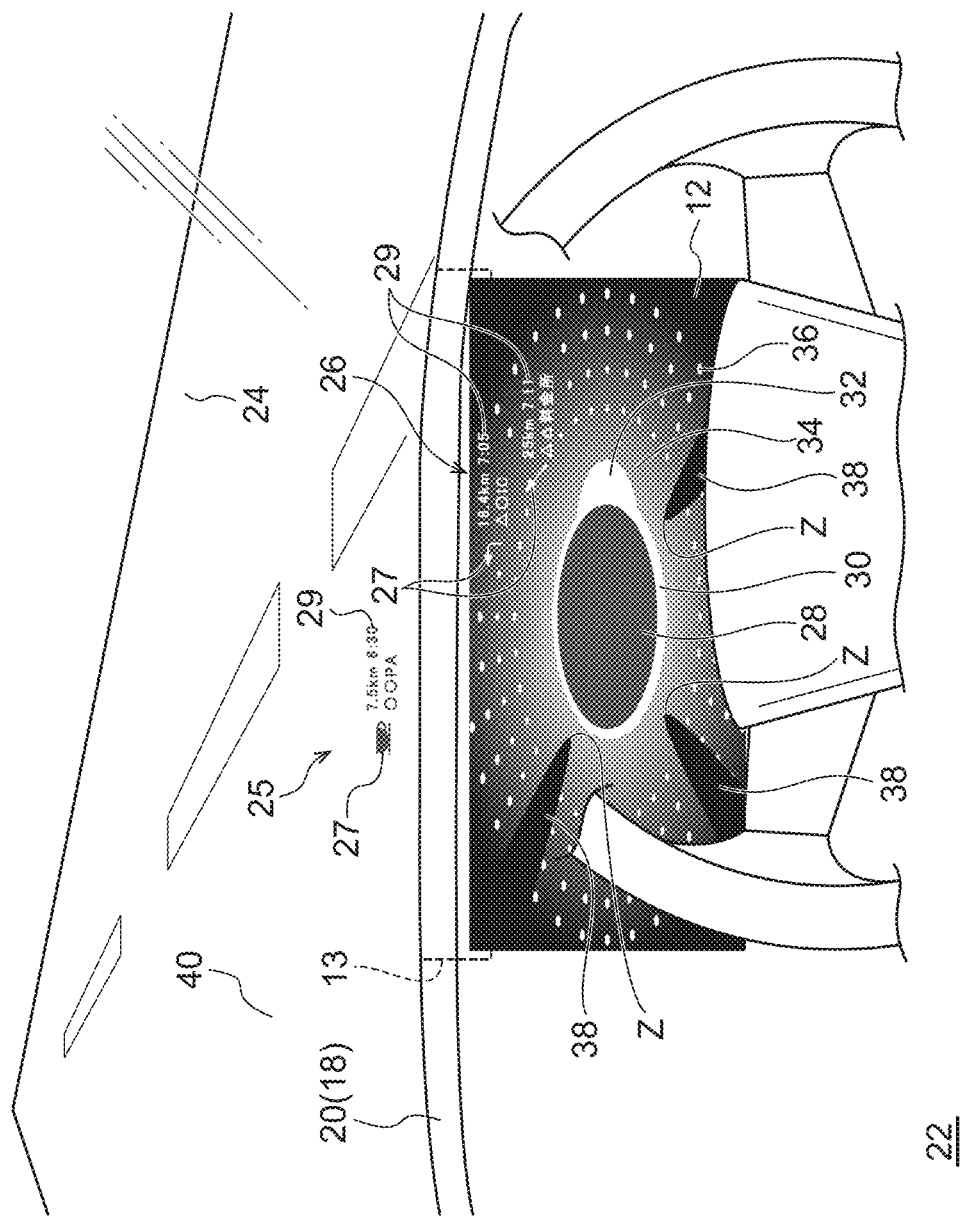
FIG. 2 is a schematic view showing an example of an operating state of the display device for a vehicle according to the exemplary embodiment.

As is shown in FIG. 2, the primary planned action 25 is projected onto (i.e., displayed at) a position on the front windshield 24 that corresponds to the vehicle upper side of the meter panel 12 by the HUD device 13. The primary planned action 25 includes an icon 27 showing the contents of the planned action A in stylized form, and text information 29 showing the distance to the destination where the planned action A is to be performed, the predicted time of arrival at this destination, and the name of this destination and the like. In FIG. 2, as an example, the planned action A 'rest break at a parking area' is displayed as the primary planned action 25. In this primary planned action 25, the icon 27 of a coffee cup, which is a stylization of 'rest break', and the text information 29 showing the distance from the current location to the parking area, the predicted time of arrival at the parking area, and the name of the parking area are displayed.

(Secondary Planned Actions)

The secondary planned actions 26 are displayed on the meter panel 12 and, in the same way as the primary planned action 25, are formed so as to include an icon 27 and text information 29. A plurality of planned actions (two are shown in FIG. 2) are capable of being displayed as the secondary planned actions 26, and the number of planned actions displayed can be suitably altered, for example, in accordance with their relationship with other displayed contents.

An icon 27 and text information 29 showing the planned action (hereinafter, referred to as 'planned action B') out of the secondary planned actions 26 that is to be performed next after the planned action A are displayed in a position on the meter panel 12 that is close to the HUD device 13, in other words, are displayed on the vehicle upper side of the meter panel 12. In addition, an icon 27 and text information 29 showing the planned action (hereinafter, referred to as 'planned action C') that is to be performed next after the planned action B are displayed in a position on the vehicle lower side and on the outer side in the vehicle width direction relative to the icon 27 and text information 29 showing the planned action B. In other words, the secondary planned actions 26 are displayed on the meter panel 12 so as to be progressively further from the HUD device 13 in a descending sequence in which the plurality of planned actions are to be executed.

The icon 27 and text information 29 of each of the secondary planned actions 26 are displayed by being sequentially arranged in a line extending on the vehicle lower side and the outer side in the vehicle width direction relative to the primary planned action 25. Looking at this from another viewpoint, the secondary planned actions 26 are displayed in a row running substantially parallel to the direction in which a rectilinear road 40 stretches towards the front of the vehicle as seen from the front windshield side which is facing towards the vehicle front. In other words, in the case of a right-hand drive vehicle such as that of the present exemplary embodiment, the secondary planned actions 26 are displayed in a diagonal line extending towards the vehicle lower side and the outer side (i.e., the right side) in the vehicle width direction, and centered on the primary planned action 25.

Figure 3:
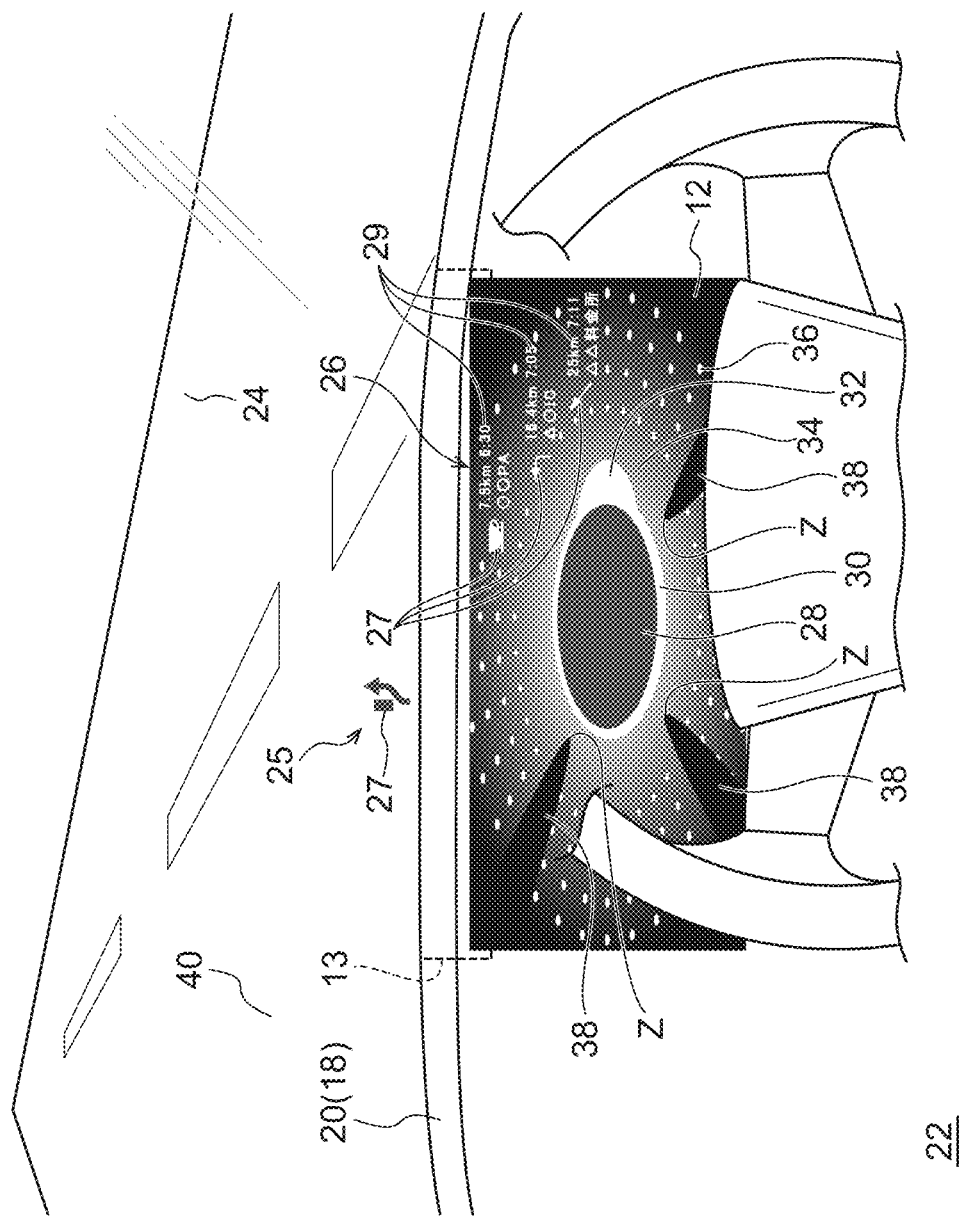
FIG. 3 is a schematic view showing another example of an operating state of the display device for a vehicle according to the exemplary embodiment.

When a vehicle occupant performs an operation so as to insert (i.e., so as to add) an arbitrary planned action (hereinafter, referred to as 'planned action D') into the series of planned actions calculated by the self-driving control unit while the vehicle is performing self-driving, the self-driving control unit determines whether the planned action D equates to the planned action that is to be performed next after the current vehicle action (in other words, equates to planned action A), or equates to a planned action to be performed after the planned action A. Based on the result of this determination, the display control device 16 is able to insert the planned action D into either the display of the primary planned action 25 or the display of the secondary planned actions 26. As an example, as is shown in FIG. 3, if, while the vehicle is performing self-driving, the driver performs an operation to issue a command to the vehicle to overtake another vehicle traveling in front (not shown in the drawings), the self-driving control unit determines that the overtaking action (i.e., planned action D) is a planned action that should be performed prior to the rest break, which had up until that point been the initial planned action A, and having determined that this overtaking action (i.e., planned action D) now equates to the new planned action A, sets the overtaking action as the planned action to be performed next after the current vehicle action (i.e., traveling normally along the road 40). Based on this determination made by the self-driving control unit, the display control device 16 then causes an icon 27 representing the overtaking action to be displayed on the front windshield 24 by the HUD device 13.

Meanwhile, the icon 27 and text information 29 representing 'rest break' that had up until that point been displayed by the HUD device 13 as the initial planned action A are displayed on the HUD device 13 side of the meter panel 12 as a secondary planned action 26 due to the insertion of the overtaking action. When the overtaking action is completed, the icon 27 and text information 29 representing 'rest break' that were being displayed as a secondary planned action 26 are once again displayed by the HUD device 13 on the front windshield 24 (see FIG. 2).

(Host Vehicle Display)

The host vehicle display 28 is displayed substantially in a center in a vehicle up-down direction of the meter panel 12 and, as an example, displays the host vehicle schematically in a dark color and as an elliptical shape whose longitudinal direction extends substantially in the vehicle width direction. Generally, the host vehicle display 28 is set such that it does not move within the meter panel 12.

(Attention Direction Display)

The attention direction display 30 is displayed outside the host vehicle display 28 and in a toroidal shape encircling an outer edge of the host vehicle display 28 and, as an example, is displayed having a greater brightness than the host vehicle display 28. As is shown in FIG. 2, a portion in a circumferential direction of the attention direction display 30 is stretched towards the outer side in a radial direction while remaining centered on the host vehicle display 28 so as to form a highlighted display portion 32. This highlighted display portion 32 is capable of moving around the outer edge of the host vehicle display 28 in accordance with detection results from the peripheral situation acquisition unit. Additionally, depending on the detection results from the peripheral situation acquisition unit, there may also be cases when the highlighted display portion 32 is not displayed.

(Peripheral Situation Display)

The peripheral situation display 34 is displayed on the outer side of the attention direction display 30 and, as an example, is displayed monochromatically and centered on the attention direction display 30, and is also displayed in what is known as gradation in which the color tone thereof becomes progressively lighter the further it is from the attention direction display 30. The color of the peripheral situation display 34 is set such that it changes so as to match the peripheral situation outside the vehicle which is determined by the display control device 16. As an example, if there are few attention-requiring objects, which are objects requiring attention such as other vehicles and the like, around the vehicle, then the peripheral situation display 34 can be displayed in a blue color so as to indicate that the vehicle periphery is in a good state. If, in contrast to this, there are a number of attention-requiring objects around the vehicle periphery, then the peripheral situation display 34 can be displayed in a yellow color so as to indicate that the vehicle periphery is in a state in which caution is required. Note that if there are an extremely large number of attention-requiring objects around the vehicle periphery, then the peripheral situation display 34 can be displayed in a red color with no gradation so as to indicate that the driver's judgment is required.

In addition, a plurality of dots 36 are also displayed on the peripheral situation display 34. These dots 36 are set having a higher brightness than other portions, and are displayed as a plurality of concentric circles centered on the host vehicle display 28.

(Attention-requiring Object Display)

When an attention-requiring object is present around the vehicle periphery, and the peripheral situation acquisition unit has detected this attention-requiring object, then the attention-requiring object display 38 is displayed on the peripheral situation display 34. The attention-requiring object display 38 is set having a lower brightness than the peripheral situation display 34, and is displayed as what might be called a shadow that becomes progressively wider the further it gets from an apex Z, which is displayed adjacent to the host vehicle display 28, approaching a portion on the meter panel 12 that corresponds to the direction in which the attention-requiring object is located in relation to the host vehicle. Accordingly, when an attention-requiring object display 38 is displayed, the peripheral situation display 34 appears to have a corresponding portion missing from it. In other words, the shape of the peripheral situation display 34 is changed by the attention-requiring object displays 38. Note that the vehicle front-rear direction of the host vehicle is displayed as extending in the vehicle up-down direction on the meter panel 12, while the vehicle width direction of the host vehicle is displayed as extending in the vehicle width direction on the meter panel 12. As an example, if an attention-requiring object is present on the vehicle front side of the host vehicle, then the vehicle upper side of the host vehicle display 28 on the meter panel 12 equates to the aforementioned 'portion on the meter panel 12 that corresponds to the direction in which the attention-requiring object is located in relation to the host vehicle'. In the same way, if an attention-requiring object is present on the vehicle rear side of the host vehicle, then the vehicle lower side of the host vehicle display 28 on the meter panel 12 equates to the aforementioned 'portion on the meter panel 12 that corresponds to the direction in which the attention-requiring object is located in relation to the host vehicle'. The same applies to the vehicle width directions. For example, if an attention-requiring object is present on the vehicle right side of the host vehicle, then the vehicle right side of the host vehicle display 28 on the meter panel 12 equates to the aforementioned 'portion on the meter panel 12 that corresponds to the direction in which the attention-requiring object is located in relation to the host vehicle', and if an attention-requiring object is present on the vehicle left side of the host vehicle, then the vehicle left side of the host vehicle display 28 on the meter panel 12 equates to the aforementioned 'portion on the meter panel 12 that corresponds to the direction in which the attention-requiring object is located in relation to the host vehicle'.

The apex Z of an attention-requiring object display 38 that is adjacent to the host vehicle display 28 is set such that the shape thereof changes in accordance with the degree of influence that the attention-requiring object has on the host vehicle. As an example, in the case of an attention-requiring object display 38 for an attention-requiring object that is traveling at a considerable relative speed in relation to the host vehicle and, therefore, whose level of influence thereon is correspondingly large, the angle of the apex Z is small, in other words, is displayed as sharp point. In contrast, in the case of an attention-requiring object display 38 for an attention-requiring object that is traveling at a slow relative speed in relation to the host vehicle and, therefore, whose level of influence thereon is correspondingly small, the angle of the apex Z is large, in other words, is displayed as a gentler curve. Note that, in the present exemplary embodiment, the angle of the apex Z is set so as to change in accordance with the size of the relative speed of the attention-requiring object in relation to the host vehicle, however, the present exemplary embodiment is not limited to this, and it is also possible for the angle of the apex Z to be set so as to change in accordance with different parameters, such as the size of the angle between the direction of travel of the host vehicle and the direction of travel of the attention-requiring object.

(Control Flow)

The display control device 16 controls operations of the HUD device 13 and the meter panel 12 as a result of the CPU executing a program stored in advance in the ROM by expanding this program in the RAM. More specifically, as is shown in FIG. 4, in step S100, the display control device 16 acquires a series of planned actions from the self-driving control unit.

In step S102, the display control device 16 causes the planned action A out of the planned actions acquired from the self-driving control unit to be displayed as the primary planned action 25 on the front windshield 24 (see FIG. 1) by the HUD device 13. Next, in step S104, the planned actions B and C are displayed as the secondary planned actions 26 on the meter panel 12 (see FIG. 2).

In step S106, whether or not the planned action A has been executed is determined by the self-driving control unit. If the result of this determination is that planned action A has been executed, then in step S108, planned action B is moved up to the position of planned action A. In the same way, planned action C and the planned action to be performed next after planned action C are each moved up respectively to the positions of planned action B and planned action C. In step S102, the planned action A that has been moved up from the position of planned action B is displayed on the front windshield 24 as the primary planned action 25 by the HUD device 13. In the same way, the planned action B and planned action C that were moved up respectively from the positions of planned action C and the planned action to be performed next after planned action C in step S108 are displayed in step S104 as the secondary planned actions 26 on the meter panel 12. In other words, the displays of the primary planned action 25 and the secondary planned actions 26 are each switched.

If, on the other hand, it is determined in step S106 that planned action A has not been executed, then in step S102, the current planned action A remains displayed by the HUD device 13 as the primary planned action 25. Moreover, in step S104, the current planned actions B and C remain displayed on the meter panel 12 as the secondary planned actions 26.

In step S110, whether or not self-driving has ended is determined by the display control device 16. If the result of this determination is that self-driving has not ended, the routine returns to step S102 and the processing of step S102 is repeated. If, on the other hand, it is determined in step S110 that self-driving has ended, then the processing performed by the display control device 16 is ended.

(Action of the Present Exemplary Embodiment)

Next, an action of the present exemplary embodiment will be described.

As is shown in FIG. 1, in the present exemplary embodiment, the display device for a vehicle 10 has the HUD device 13, the meter panel 12, and the display control device 16. The HUD device 13 is provided on the vehicle cabin interior side of the front windshield 24, and by projecting projection light used to display information onto the front windshield 24, is able to cause information to be displayed superimposed on the scenery visible in front of the vehicle. The meter panel 12 is provided in the instrument panel 18 of the vehicle, and displays information towards the vehicle occupants' seat side. The display control device 16 acquires planned actions for the vehicle from the self-driving control unit that performs self-driving control for the vehicle when the vehicle is being self-driven. Additionally, of the acquired planned actions, the display control device 16 causes the planned action that is to be performed next after the vehicle action currently being performed to be displayed by the HUD device 13 as the primary planned action 25. Furthermore, of the acquired planned actions, the display control device 16 causes the planned actions that are to be performed next after the primary planned action 25 to be displayed on the meter panel 12 as the secondary planned actions 26. In other words, a number of planned actions that are to be performed subsequently to the vehicle action currently being performed are continuously displayed by the HUD device 13 and the meter panel 12, and the primary planned action 25, which is the very next planned action to be performed, and the secondary planned actions 26, which are the planned actions to be performed subsequently to the primary planned action 25 are displayed in mutually different positions. Accordingly, a vehicle occupant is able to immediately ascertain a plurality of planned actions, and is able to intuitively understand both the planned action that is to be performed next, and the planned actions that are to be performed subsequently thereto. Moreover, because the secondary planned actions 26 are displayed in the sequence in which they are to be performed starting from a location on the meter panel 12 that is close to the HUD device 13, the planned actions are displayed connected to each other in the sequence in which they are to be executed starting from the HUD device 13 and approaching the meter panel 12. Accordingly, a vehicle occupant is able to intuitively ascertain the flow of a series of planned actions. As a consequence, it is possible to reduce any sense of anxiety experienced by a vehicle occupant of a vehicle that is capable of traveling in self-driving mode when that vehicle is performing self-driving.

Moreover, the secondary planned actions 26 are displayed on the meter panel 12. Generally, because the meter panel 12 is located in a position in the instrument panel 18 that is close to the front windshield 24, the primary planned action 25 which is displayed by the HUD device 13, and the secondary planned actions 26 which are displayed on the meter panel 12 can be displayed in comparatively close positions to each other. Accordingly, a vehicle occupant is able to understand even more intuitively the flow from the primary planned action to the secondary planned action 26.

Furthermore, once the execution of the primary planned action 25 displayed by the HUD device 13 has been completed, the planned action that is to be performed the soonest out of the secondary planned actions 26 displayed on the meter panel 12 is moved up and displayed by the HUD device 13 as the primary planned action 25. Accordingly, a vehicle occupant is able to even more intuitively understand the flow of a series of planned actions.

In addition, because the primary planned action 25 and the secondary planned actions 26 are displayed by being arranged in a substantially rectilinear row when viewed from the side of the vehicle occupant seat, a vehicle occupant is able to even more intuitively understand the flow of a series of continuous primary planned actions 25 and secondary planned actions 26.

Moreover, because the secondary planned actions 26 are displayed by being arranged in a row extending towards an outer side in a vehicle width direction and towards a vehicle lower side relative to the primary planned action 25 when viewed from the side of the vehicle occupant seat, the secondary planned actions 26 are displayed in the manner of a perspective drawing whose center of perspectivity is the primary planned action 25 that is displayed by being superimposed on the scenery to the front of the vehicle. Accordingly, a vehicle occupant is able to even more intuitively understand the flow of a sequence from the primary planned action 25 to the secondary planned actions 26.

Furthermore, when a vehicle occupant performs an operation so as to insert an arbitrary planned action D while the vehicle is performing self-driving, because the arbitrary planned action D can be displayed by being inserted as either the primary planned action 25 or as any one of the secondary planned actions 26, the vehicle occupant is able to intuitively understand whether or not the vehicle has recognized the operation performed by the vehicle occupant.

Additionally, because the planned action displayed by the HUD device 13 is limited to the primary planned action 25, the display of information in a position easily viewed by a vehicle occupant, namely, on the front windshield 24 is extremely simple, so that any confusion of the vehicle occupant caused by an oversupply of information can be avoided.

Note that, in the present exemplary embodiment, the meter panel 12 is a liquid crystal panel that is provided in the meter cluster 20, however, the present disclosure is not limited to this, and it is also possible for another display panel or the like provided in the instrument panel 18 to be used.

Moreover, the display device for a vehicle 10 is applied to a vehicle that is capable of performing self-driving, however, the present disclosure is not limited to this and it is also possible for the display device for a vehicle 10 to be applied to a different type of vehicle.

Additionally, the primary planned action 25 and the secondary planned actions 26 are each displayed using at least one of an icon 27 and text information 29, however, the present disclosure is not limited to this, and a different type of display such as images or the like may also be used.

Furthermore, a structure is employed in which the display is changed when the primary planned action 25 and the secondary planned actions 26 are moved up in the planned action sequence, however, the present disclosure is not limited to this, and it is also possible for the movement of the planned actions of the secondary planned actions 26 towards the primary planned action 25 to be represented by an animation or the like at the timings when the planned actions are moved up in sequence. Additionally, this movement may also be represented via another display method.

Moreover, a structure is employed in the present exemplary embodiment in which two or three planned actions are displayed as the secondary planned actions 26 (see FIG. 2 and FIG. 3), however, the present disclosure is not limited to this, and it is also possible to employ a structure in which four or more, or alternatively, all of the planned actions are displayed.

Furthermore, the secondary planned actions 26 are displayed via their respective icons 27 and text information 29 extending in a row towards the vehicle lower side and the outer side in the vehicle width direction relative to the primary planned action 25, however, the present disclosure is not limited to this, and the secondary planned actions 26 may also be displayed via a different display method such as in a row extending horizontally, a row extending vertically, or a row extending along a curve.

An exemplary embodiment of the present disclosure has been described above, however, the present disclosure is not limited to this. Various modifications and the like may be made to the present disclosure insofar as they do not depart from the spirit or scope of the present disclosure.

What is claimed is:

1. A display control device for a vehicle, the display control device comprising:
a processor configured to display a primary plan on a first display and a secondary plan on a second display, wherein:
the primary plan is to be performed next after a vehicle action currently being performed,
the secondary plan is to be performed subsequently to the primary plan,
the first display is provided on an upper side of the second display, and
the secondary plan is represented by an amination that moves towards the primary plan at a timing when the plans are moved up in sequence.

2. The display control device for a vehicle according to claim 1, wherein the first display is a head-up display, and the second display is a meter panel.

3. The display control device for a vehicle according to claim 1, wherein the primary plan and the secondary plan are displayed so as to be arranged in a substantially rectilinear row when viewed from a side of a vehicle occupant seat.

4. The display control device for a vehicle according to claim 1, wherein the secondary plan is displayed so as to be arranged in a row extending towards an outer side in a vehicle width direction and towards a vehicle lower side relative to the primary plan when viewed from a side of a vehicle occupant seat.

5. The display control device for a vehicle according to claim 1, wherein, when a vehicle occupant performs an operation so as to insert an arbitrary plan, the arbitrary plan can be displayed so as to be inserted as either the primary plan or the secondary plan.

6. A display device for a vehicle, the display device comprising:
a display control device for the vehicle according to claim 1;
the first display; and
the second display.

7. The display device according to claim 6, wherein the first display is a head-up display, and the second display is a meter panel.

8. The display device according to claim 6, wherein the primary plan and the secondary plan are displayed so as to be arranged in a substantially rectilinear row when viewed from a side of a vehicle occupant seat.

9. The display device according to claim 6, wherein the secondary plan is displayed so as to be arranged in a row extending towards an outer side in a vehicle width direction and towards a vehicle lower side relative to the primary plan when viewed from a side of a vehicle occupant seat.

10. The display device according to claim 6, wherein, when a vehicle occupant performs an operation so as to insert an arbitrary plan, the arbitrary plan can be displayed so as to be inserted as either the primary plan or the secondary plan.

11. A vehicle comprising:
a display control device for a vehicle according to claim 1;
the first display; and
the second display.

12. A display control program executable by a processor installed at a vehicle, the display control program comprising:
displaying a primary plan on a first display and a secondary plan on a second display, wherein:
the primary plan is to be performed next after a vehicle action currently being performed,
the secondary plan is to be performed subsequently to the primary plan,
the first display is provided on an upper side of the second display, and
the secondary plan is represented by an amination that moves towards the primary plan at a timing when the plans are moved up in sequence.

* * * * *